United States Patent
Kondo (10) Patent No.: US 7,090,310 B2
(45) Date of Patent: Aug. 15, 2006

(54) BRAKE DEVICES (75) Inventor: Masuhiro Kondo, Obu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/943,039

(22) Filed: Sep. 17, 2004

(65) Prior Publication Data

US 2005/0093367 A1 May 5, 2005

(30) Foreign Application Priority Data

Sep. 22, 2003 (JP) .............................. 2003-330300

(51) Int. Cl.
*B60T 17/04* (2006.01)
(52) U.S. Cl. ................. 303/87; 303/DIG. 11
(58) Field of Classification Search .................. 303/87, 303/119.1, 116.4, 116.1, 113.1, 10, 117.1, 303/68–69, 900, 901, 116.3, DIG. 11; 138/30, 138/26, 37–46; 417/540
See application file for complete search history.

(56) References Cited

U.S. PATENT DOCUMENTS 5,058,961 A * 10/1991 Mergenthaler et al. .. 303/115.4
5,628,550 A * 5/1997 Zaviska et al. .......... 303/115.4
6,000,764 A 12/1999 Dokas
2005/0023889 A1 * 2/2005 Masuhiro ..................... 303/87

FOREIGN PATENT DOCUMENTS

JP 8-230642 9/1996

* cited by examiner

Primary Examiner—James McClellan
Assistant Examiner—Bradley T. King
(74) Attorney, Agent, or Firm—Buchanan Ingersoll PC (57) ABSTRACT A brake device has at least one wheel cylinder operable by the pressure of a working liquid. A reservoir stores the working liquid discharged from the at least one wheel cylinder during the operation of an anti-lock braking function. A pump serves to transfer the working liquid from the reservoir. An outlet valve is disposed on the discharge side of the pump. A master cylinder receives the working liquid delivered from the pump via the outlet valve. A pulsation reducing device is disposed on a downstream side of the outlet valve between the pump and the master cylinder. The pulsation reducing device controls the operation speed of the outlet valve in order to reduce possible pulsations produced in the working liquid discharged from the pump.

14 Claims, 7 Drawing Sheets

_BRAKE DEVICES_

This application claims priority to Japanese patent application serial number 2003-330300, the contents of which are incorporated herein by reference.

BACKGROUND OF THE INVENTION

1. Field of the Invention

The present invention relates to brake devices having a pump that serves to pump a working liquid previously discharged into a reservoir from the wheel cylinders and to deliver the working liquid to a master cylinder via a discharge valve associated with the pump.

2. Description of the Related Art

In general, brake devices have a master cylinder and a wheel cylinder(s). The master cylinder serves to pressurize a working liquid in response to the operation of a brake pedal so as to deliver hydraulic pressure via the working liquid to the wheel cylinder(s). The wheel cylinder(s) then functions to press the friction surfaces of brake pads against a brake disk as a result of the pressure of the working liquid.

Brake devices having an anti-lock function for preventing a wheel(s) from being locked up during braking (i.e., stopping rotation while the vehicle is still moving) are also known. These types of brake devices typically have an actuator that includes a reservoir and a pump. The reservoir serves to store the working liquid that is discharged from the wheel cylinder(s) when the pressure of the wheel cylinder(s) is to be reduced (thereby, eliminating or preventing the locking effect upon the wheel). The pump then serves to pump the working liquid stored within the reservoir in order to deliver the working liquid to the master cylinder. Conventionally, a reciprocating pump (e.g., a plunger pump) has been generally used as a pump for this type of brake device. Japanese Laid-Open Patent Publication No. 8-230642 and U.S. Pat. No. 6,000,764 teach such brake devices.

However, the working liquid discharged from the reciprocating pump naturally has pulsations in pressure. Such pulsations may cause vibrations of various pipelines, the master cylinder, etc., of the brake device, possibly producing unpleasant vibration sounds. In addition, vibrations may be transmitted to the vehicle body and create an uncomfortable feeling or sensation for passengers.

In order to reduce the effects of pulsations of the working liquid, there has been proposed to provide a damper chamber on the downstream side of the pump. However, in many cases it has been difficult to effectively suppress the pulsations only by the provision of the damper chamber.

SUMMARY OF THE INVENTION

It is accordingly an object of the present invention to teach improved techniques for effectively reducing pulsations in the pressure of a working liquid discharged from a pump of a brake device.

According to one aspect of the present teachings, brake devices are taught that include at least one wheel cylinder operable by the pressure of a working liquid, a reservoir for storing the working liquid discharged from the at least one wheel cylinder, a pump for pumping the working liquid from the reservoir, an outlet valve disposed on a discharge side of the pump, and a master cylinder for receiving the working liquid delivered from the pump via the outlet valve. A pulsation reducing device is disposed on a downstream side of the outlet valve between the pump and the master cylinder. The pulsation reducing device controls the operation speed of the outlet valve in order to reduce possible pulsations produced in the working liquid discharged from the pump.

Therefore, possible pulsations in the working liquid discharged from the pump can be reliably reduced.

In another aspect of the present teachings, the pulsation reducing device controls the operation speed of the outlet valve only with respect to the movement of the outlet valve in an opening direction.

Therefore, the outlet valve may be prevented from being rapidly opened. In other words, the rate of increase in the pressure of the working liquid discharged from the pump via the outlet valve can be lowered. As a result, the peak value of possible pulsations of the discharged working liquid can be lowered, so that the amplitude distribution of the pulsations can be smoothed (i.e., the pulsations can be reduced). On the other hand, when the outlet valve is closed, the outlet valve may not be significantly prevented from moving in the closing direction. Therefore, the outlet valve may rapidly close to prevent the back flow of the working liquid toward the pump via the outlet valve.

In another aspect of the present teachings, the pulsation reducing device controls the operation speed of the outlet valve with respect to the movement of the outlet valve in both opening and closing directions. In addition, the force for suppressing the movement of the outlet valve in the opening direction is greater than the force for suppressing the movement of the outlet valve in the closing direction. In other words, the pulsation reducing device causes the movement of the outlet valve in the opening direction to be at a lower rate than the movement of the outlet valve in the closing direction.

Therefore, the outlet valve may not operate as rapidly to open in comparison with the closing operation, so that the rate of increase of pressure of the working liquid discharged via the outlet valve is lowered. As a result, the peak value of possible pulsations of the discharged working liquid can be lowered, and the amplitude distribution of the pulsations can be smoothed (i.e., the pulsations can be reduced). On the other hand, when the outlet valve is closed, the outlet valve may rapidly close, because the suppressing force against the closing movement of the outlet valve produced by the pulsation reducing device is relatively small. Therefore, the outlet valve can rapidly close to prevent the back flow of the working liquid toward the pump via the outlet valve.

In another aspect of the present teachings, the pulsation reducing device includes a plunger disposed on the downstream side of the outlet valve and movable in response to the movement of the outlet valve, and a support member for movably receiving the plunger. A liquid control chamber is defined within a support hole on one side of the moving direction of the plunger (creating a cylindrical cavity bordered by the support member around the circumference and one axial end and bordered by the plunger on the other axial end). A flow control device serves to provide communication between the liquid control chamber and the outside of the support member. The flow control device also controls the flow rate of the working liquid flowing between the liquid control chamber and the outside of the support member so as to control the moving speed of the plunger.

Thus, the liquid control chamber is defined within the support hole that receives the plunger. The flow control device controls the flow rate of the working liquid flowing between the liquid chamber and the outside of the support member. For example, if the flow rate of the working liquid flowing out of the liquid control chamber is reduced, the plunger may be inhibited in moving toward the liquid control chamber. In other words, the flow control device may control the moving speed of the plunger so that the plunger can modify the opening or closing speed of the outlet valve.

In another aspect of the present teachings, the flow control device has a plurality of communication paths communicating between the liquid control chamber and the outside of the support member. The flow control device is operable to open and close at least one of the communication paths in response to the moving direction of the plunger.

For example, if the movement of the plunger toward the liquid control chamber closes one of the communication paths, the flow rate per unit time of the working liquid flowing out of the liquid chamber may be reduced. The movement of the plunger toward the liquid control chamber may then be restricted. Consequently, the plunger may function to lower the opening speed of the outlet valve.

In another aspect of the present teachings, brake devices are taught that include at least one brake cylinder operable by the pressure of a working liquid. For example, the brake cylinder may be a wheel cylinder for applying a braking force to a wheel of an automobile. A pump serves to deliver the working liquid to the at least one brake cylinder. An outlet valve that may be configured as a check valve is disposed on a discharge side of the pump. A pulsation reducing device is associated with the outlet valve and is operable to control the operating speed of the outlet valve in response to changes in pressure of the working liquid discharged from the pump.

Therefore, the pulsation reducing device may control the pressure of the working liquid discharged from the pump via the outlet valve in order to reduce or minimize the potential pulsations of the working liquid.

In another aspect of the present teachings, the pulsation reducing device serves to reduce the operating speed of the outlet valve as the pressure of the working liquid discharged from the pump increases (for example, when the pressure increase causes the outlet valve to move in the opening direction).

In another aspect of the present teachings, the outlet valve includes a valve member movable in an opening direction by the pressure of the working liquid discharged from the pump. The pulsation reducing device includes a movable member, a support member, a liquid control chamber, a communication device, and a flow control device. The movable member is disposed opposite the valve member along the opening direction of the valve member. The support member serves to support the movable member such that the movable member is slidably movable relative to the support member in a direction parallel to the moving direction of the valve member. The liquid control chamber is a substantially cylindrical cavity defined between the movable member and the support member. The communication device provides communication between the liquid control chamber and the outside of the support member. The flow control device controls the flow of the working liquid that flows through the communication device in response to the movement of the movable member relative to the support member.

In another aspect of the present teachings, the movable member is a plunger and the support member has a support hole defined within the support member in order to slidably receive the plunger. The liquid control chamber is a substantially cylindrical cavity defined by the plunger within the support hole. The plunger borders one axial end of the liquid control chamber on the side of the plunger opposite to the valve member. The support hole borders the circumference and the other axial end of the liquid control chamber. Preferably, the outlet valve is a ball and one end of the plunger opposing to the ball has a spherical concave surface corresponding to an outer peripheral surface of the ball, so that the ball contacts with the plunger via the spherical concave surface of the plunger.

In another aspect of the present teachings, the brake devices further includes a biasing device that biases the plunger in the closing direction of the valve member.

In another aspect of the present teachings, the communication device includes a first communication path defined by the plunger and an inner wall of the support hole. The first communication path has a first end communicating with the liquid control chamber and a second end communicating with the outside of the support member. The flow control device serves to control the flow of the working liquid through the first communication path.

In another aspect of the present teachings, the flow control device includes a control member disposed axially movably within a first recess. The first recess is formed in an outer surface of the plunger. The first recess has a first end and a second end along the axial direction of the plunger. The first end communicates with the liquid control chamber and the second end communicates with the outside of the support member. The first communication path includes a first flow channel defined between the control member and an inner wall of the first recess. The control member is operable to open and close the first flow channel in response to the axial position of the control member relative to the first recess.

In another aspect of the present teachings, the communication device further includes a second communication path. The second communication path includes a second flow channel defined between the control member and an inner wall of the support hole.

In another aspect of the present teachings, the control member is a ring having a thickness in the axial direction of the plunger. The first recess is an annular recess having a width in the axial direction of the plunger. The thickness of the ring is smaller than the width of the annular recess. The first flow channel includes first and second clearances defined on both sides of the ring along the axial direction and a third clearance defined between an inner peripheral surface of the ring and an inner recess wall of the annular recess opposing thereto. The ring closes one of the first and second clearances on the side of the valve member when the plunger moves in the opening direction of the valve member.

In another aspect of the present teachings, the support hole has an open first end opening into the outside of the support member and a closed second end positioned on the side opposing the plunger. The liquid control chamber is defined between the plunger and the closed second end of the support hole.

In another aspect of the present teachings, the support hole has a first end and a second end, each opening to the outside of the support member. The first end is disposed on the side of the valve member and the second end is disposed on the side opposite to the valve member, so that the liquid control chamber is defined between the plunger and the second end of the support hole. The second end of the support hole defines the first flow channel. The flow control device includes a second valve member disposed within the liquid control chamber. The second valve member is operable to open and close the second end of the support hole in response to the pressure within the liquid control chamber.

In another aspect of the present teachings, the communication device further includes a second communication path defined between the plunger and the inner wall of the support hole. The second communication path always communicates between the liquid control chamber and the outside of the support member via the first end of the support hole.

In another aspect of the present teachings, a valve seat is formed within the second end of the support hole, and the second valve member is a ball that is adapted seat against the valve seat in order to close the second end of the support hole.

DETAILED DESCRIPTION OF THE INVENTION

Each of the additional features and teachings disclosed above and below may be utilized separately or in conjunction with other features and teachings to provide improved methods and devices for reducing or minimizing pressure pulsations of working liquids discharge from the pumps of brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 1:
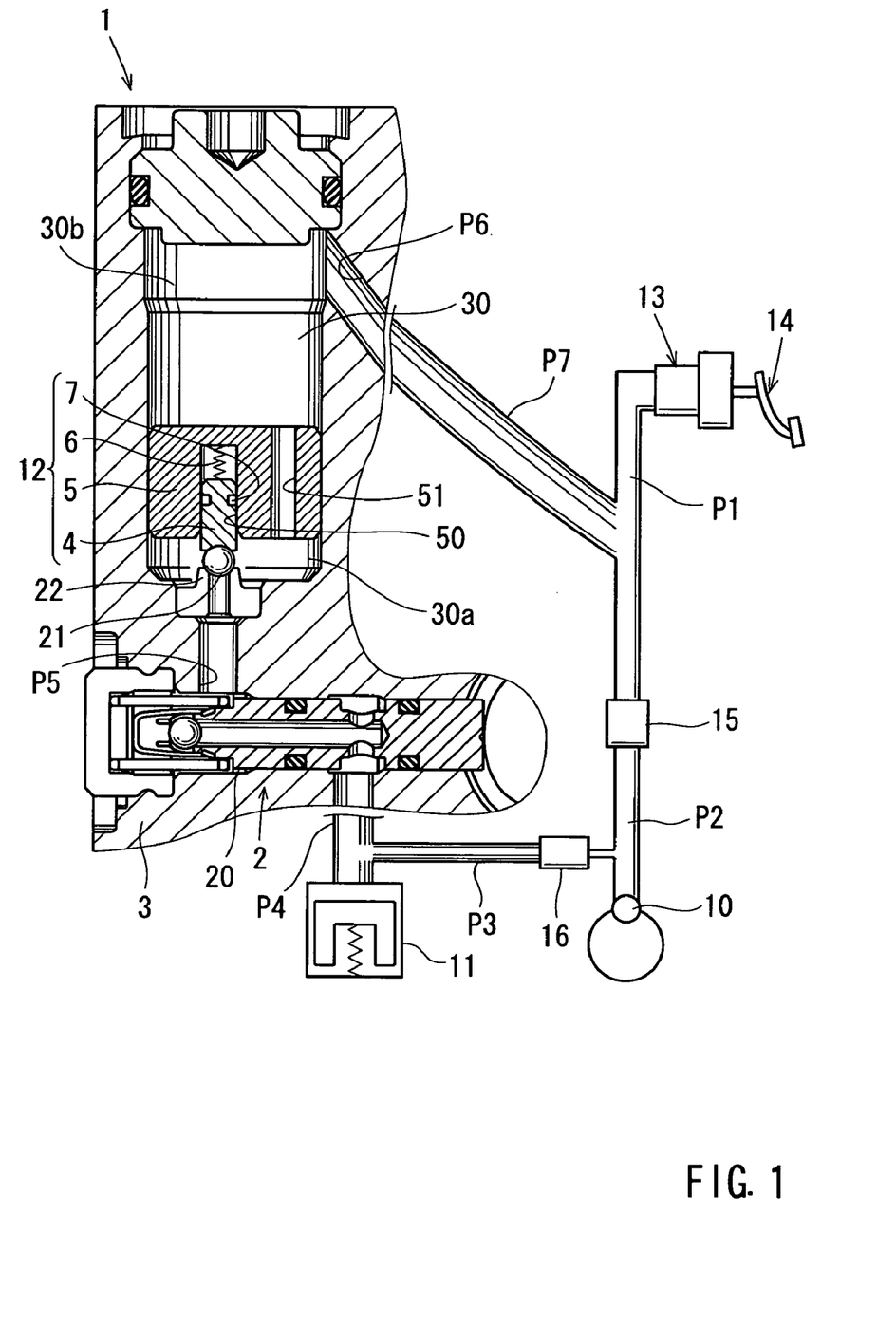
FIG. 1 is a view of a first representative brake device having a pulsation reducing device and a pump shown in cross section.

A first representative embodiment of the present invention will now be described with reference to FIGS. 1 to 6. As shown in FIG. 1, a brake device 1 according to the first representative embodiment generally includes a brake pedal 14, a master cylinder 13, and a plurality of wheel cylinders or brake cylinders 10 (only one wheel cylinder 10 is shown in the drawings). The brake device 1 also includes solenoid valves 15 and 16 for each wheel cylinder 10, a reservoir 11, a pump 2, and a damper chamber 30, that together constitute an actuator for performing an anti-lock braking function. In this first representative embodiment, the brake device 1 is designed for use with a vehicle, in particular an automobile.

The master cylinder 13 serves to pressurize a working liquid (brake fluid) in response to a pressing force applied to the brake pedal 14. The pressurized working liquid is delivered to each wheel cylinder 10 via a pipeline P1, the solenoid valve 15, and a pipeline P2.

The wheel cylinders 10 are operable to press friction materials against respective brake disks (not shown) due to the hydraulic pressure of the working liquid, so that the rotation of wheels (not shown) can be inhibited or suppressed. In general, the brake device 1 has two or four wheel cylinders 10 that are all connected in parallel with each other to the master cylinder 13. Each wheel cylinder 10 is connected to the reservoir 11 via the solenoid valve 16 and a pipeline P3. When any of the wheels begins to lock up during braking, a control unit (not shown) may output signals to close the solenoid valve 15 and to open the solenoid valve 16 of the corresponding wheel cylinder 10. The working liquid is discharged from the appropriate wheel cylinder 10 to reduce the hydraulic pressure of the working liquid within the wheel cylinder 10. As a result, the locked wheel can be released from a locked condition. The working liquid discharged from the wheel cylinder 10 is delivered to the reservoir 11 via the pipeline P3 so as to be stored within the reservoir 11. The reservoir 11 is connected to the pump 2 via a conduit P4.

As shown in FIG. 1, the pump 2 is configured as a reciprocating pump, in particular a plunger pump. The pump 2 has a pumping member (pump plunger) 20, a flow path P5, and an outlet valve 21. When operated, the pump 2 draws the working liquid from the reservoir 11 and discharges the working liquid into the damper chamber 30 via the flow path P5 and the outlet valve 21. As shown in FIG. 1, the pump 2 and the damper chamber 30 are disposed within a housing 3. The reservoir 11 also is disposed within the housing 3.

The outlet valve 21, serving as a check valve, is configured as a ball positioned on the downstream side of a valve seat 22 disposed at the outlet end of the flow path P5. The flow path P5 may be closed when the outlet valve 21 seats against the valve seat 22. On the other hand, the flow path P5 may be open when the outlet valve 21 is moved away from the valve seat 22. The outlet valve 21 is disposed within the damper chamber 30. A pulsation reducing device 12 also is disposed within the damper chamber 30.

The pulsation reducing device 12 serves to control the opening and closing speed of the outlet valve 21 in order to reduce possible pulsations in pressure of the working liquid discharged from the pump 2. As shown in FIG. 1, the pulsation reducing device 12 includes a plunger 4 and a support member 5.

Figure 2:
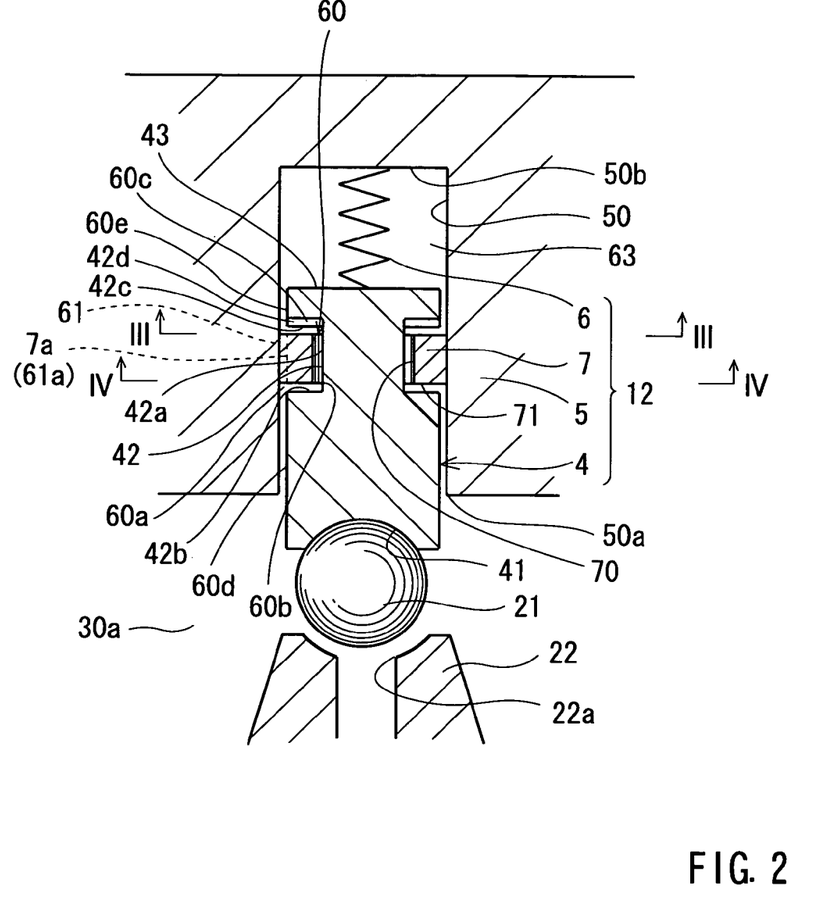
FIG. 2 is an enlarged cross sectional view of the pulsation reducing device of the first representative brake device.

As shown in FIG. 2, the plunger 4 has a substantially cylindrical configuration and has an annular recess 42 formed in the outer peripheral surface of the plunger 4. A ring 7 is fitted into the annular recess 42. The plunger 4 is inserted into a support hole 50 formed in the support member 5 and is slidably movable within the support hole 50 in an axial direction (the vertical direction as viewed in FIG. 2). A valve support portion 41 is formed at the lower end of the plunger 4 and defines a substantially hemispherical concave surface corresponding to the configuration of the outlet valve 21. The valve support portion 41 can provide a location for stably supporting the outlet valve 21. For example, scraping, cutting, or otherwise machining the lower end of the plunger 4 may form the hemispherical concave surface of the valve support portion 41. Therefore, when the outlet valve 21 moves upward (i.e., in an open direction), the outlet valve 21 is positioned on the valve support portion 41 and forces the plunger 4 to move upward.

As shown in FIG. 1, the support member 5 has a substantially cylindrical configuration and has an outer diameter that is substantially the same as the inner diameter of the damper chamber 30. The support member 5 is inserted into the damper chamber 30 in order to separate the damper chamber 30 into a first chamber 30a and a second chamber 30b. In addition to the support hole 50 for receiving the plunger 4, a communication passage 51 is formed in the support member 5. The communication passage 51 serves to provide communication between the first chamber 30a and the second chamber 30b.

As shown in FIG. 2, the support hole 50 is configured as a bottomed hole. Thus, the support hole 50 has an opening 50a on the side of the first chamber 30a and has a closed bottom 50b on the side of the second chamber 30b. The plunger 4 is inserted into the support hole 50 via the opening 50a, so that a liquid control chamber 63 is defined on the insertion side (the upper side as viewed in FIG. 2) of the plunger 4. In other words, the liquid control chamber 63 is defined within the support hole 50 by an end surface of the plunger 4 on the insertion side, the bottom 50b of the support hole 50, and the inner circumferential surface of the support hole 50.

A biasing member 6 is disposed within the liquid control chamber 63 in order to bias the plunger 4 in a direction toward the outlet valve 21 (the downward direction as viewed in FIG. 2). In this representative embodiment, the biasing member 6 is configured as a coil spring.

As shown in FIG. 2, the pulsation reducing device 12 includes a flow control device that is constituted by a first communication path 60 and a second communication path 61 which provide communication between the liquid control chamber 63 and the outside of the support member 5 (i.e., the first chamber 30a). As will be described in more detail, the first communication path 60 is opened and closed in response to the moving direction of the plunger 4. More specifically, the first communication path 60 is opened and closed when the plunger 4 respectively moves downward and upward.

Thus, the flow control device may control the flow rate per unit of time of the working liquid that flows between the liquid control chamber 63 and the outside of the support member 5. The flow control device will be hereinafter explained in more detail.

As shown in FIG. 2, the first and second communication paths, 60 and 61, are defined between the outer peripheral surface of the plunger 4 and the inner wall of the support hole 50. The first communication path 60 is configured to extend through the interior of the ring 7 and the second communication path 61 is configured to extend through the exterior of the ring 7. More specifically, the first communication path 60 is constituted by path parts 60d, 60a, 60b, 60c, and 60e, arranged in this sequence from the upstream side of the plunger 4 (i.e., starting at the opening 50a). On the other hand, the second communication path 61 is constituted by path parts 60d, 61a, and 60e, arranged in this sequence also from the upstream side of the plunger 4. The path parts 60d and 60e are common pat parts for the first and second communication paths 60 and 61 and are formed due to the difference between the outer diameter of the plunger 4 and the inner diameter of the support hole 50. As shown in FIG. 2, the path parts 60a, 60b, and 60c, are defined between the inner surface of the annular recess 42 and the ring 7.

More specifically, the path part 60a (hereinafter also referred to as "first path part 60a") is defined between the lower end surface 71 of the ring 7 and the lower wall 42b of the annular recess 42. To facilitate this end, the height (thickness) of the ring 7 is determined so as to be smaller than the width of the annular recess 42.

Figure 4:
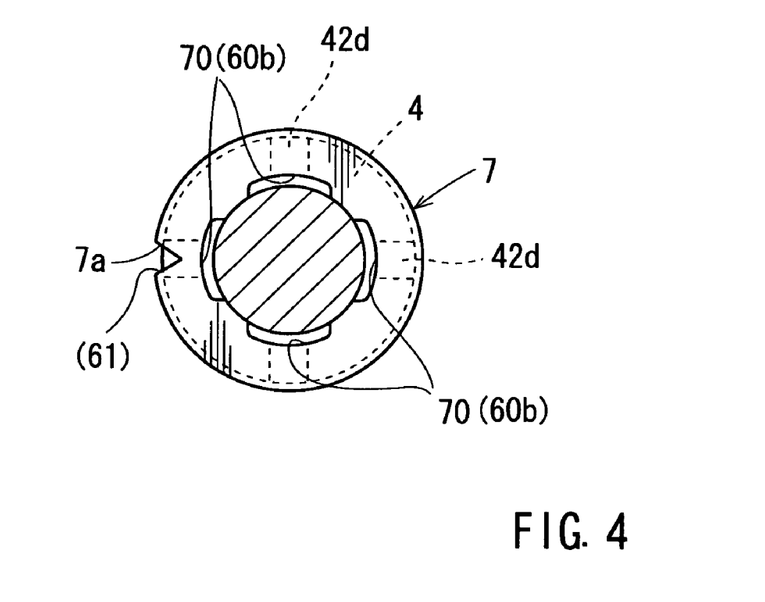
FIG. 4 is a cross sectional view of the plunger taken along line IV—IV in FIG. 2 and also showing a bottom view of a ring.

As shown in FIG. 4, a plurality of recesses 70 (four recesses 70 are provided in this representative embodiment) is formed in the inner circumferential wall of the ring 7 and extends through the thickness of the ring 7. The path parts 60b (hereinafter also referred to as "second path parts 60b") are defined between the recesses 70 and the inner recess wall 42a of the annular recess 42.

Figure 3:
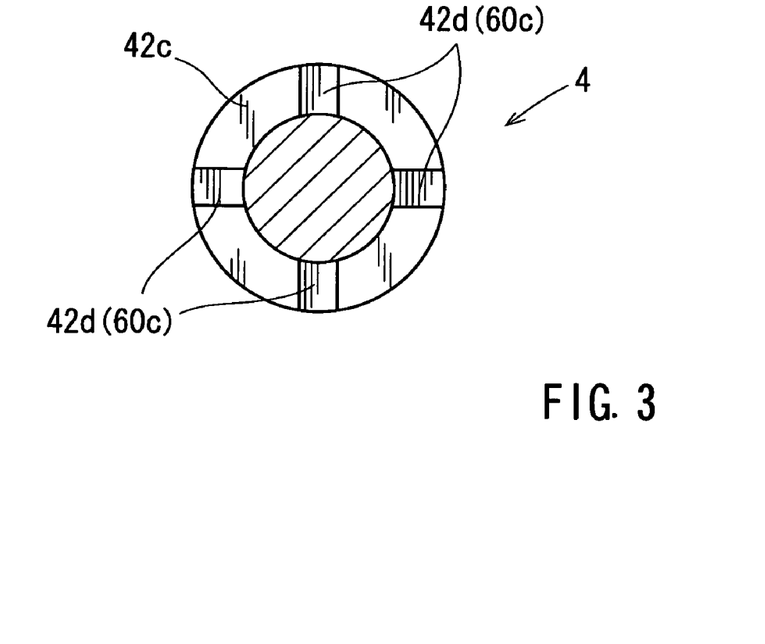
FIG. 3 is a cross sectional view of a plunger taken along line III—III in FIG. 2.

Further, as shown in FIG. 3, a plurality of recesses 42d (four recesses 42d are provided in this representative embodiment) are formed in an upper wall surface 42c of the annular recess 42 and extend in radial directions. The path parts 60c (hereinafter also referred to as "third path parts 60c") are formed by the recesses 42d as shown in FIG. 2.

Furthermore, as shown in FIG. 4, a cut-out recess 7a is formed in the outer peripheral surface of the ring 7 and extends throughout the thickness of the ring 7. The path part 61a is defined between the cut-out recess 7a and the inner wall of the support hole 50.

Figure 5:
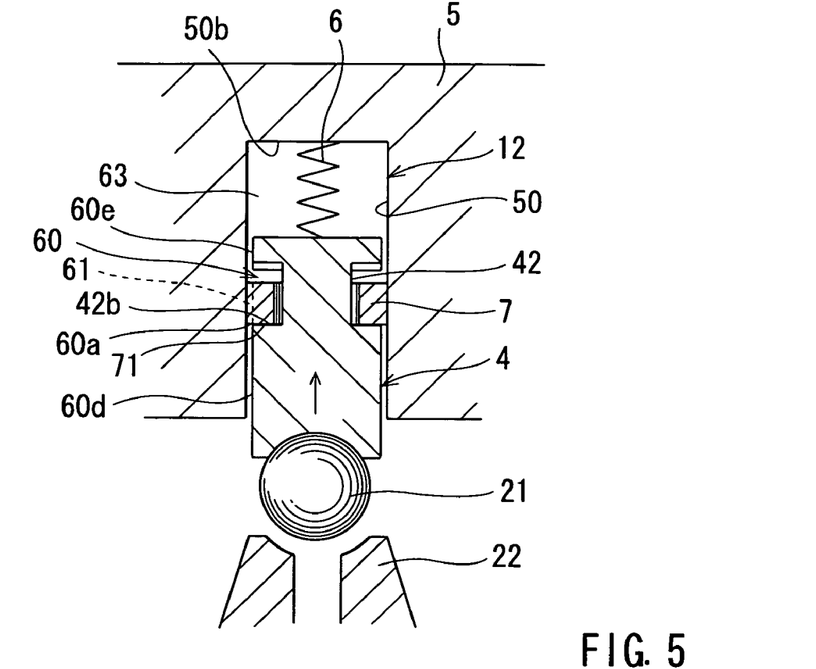
FIG. 5 is an enlarged cross sectional view of the pulsation reducing device of the first representative brake device and showing an outlet valve during the movement in an opening direction.

The operation of the pulsation reducing device 12 will now be described with reference to FIGS. 5 and 6. When the pump 2 is operated to discharge the working liquid, the outlet valve 21 is forced to move away from the valve seat 22 as shown in FIG. 5. The outlet valve 21 then forces the plunger 4 to move upward, so that the lower wall 42b of the annular recess 42 closely contacts with the lower end surface 71 of the ring 7. As a result, the path part 60a is closed, and therefore, the first communication path 60 is closed.

As the outlet valve 21 further moves upward, the plunger 4 moves together with the ring 7 into the liquid control chamber 63. Therefore, the working liquid within the liquid control chamber 63 is pressurized so as to gradually flow out of the support member 5 only via the second communication path 61, because the first communication path 60 is closed in this state.

Thus, in this orientation, the working liquid is permitted to flow out of the liquid control chamber 63 only through the second communication path 61. Therefore, the flow rate per unit of time of the working liquid flowing from the liquid control chamber 63 to the outside of the support member 5 is relatively small. Because of this reason, there is a relatively slow moving speed of the plunger 4 in the upward direction.

Figure 6:
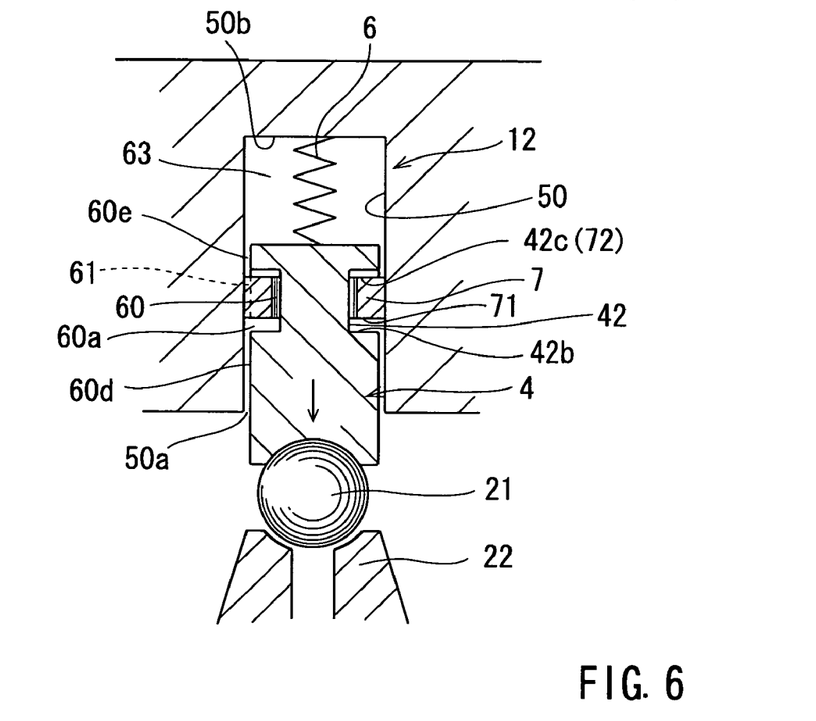
FIG. 6 an enlarged cross sectional view of the pulsation reducing device of the first representative brake device and showing the outlet valve during the movement in a closing direction.

When the pressure of the working liquid discharged from the pump 2 decreases, the biasing force of the biasing member 6 may force the plunger 4 to move downward, as shown in FIG. 6. Initially, the working liquid may flow into the liquid control chamber 63 via the second communication path 61. As the plunger 4 continues to move further downward, the lower wall 42b of the annular recess 42 may move away from the lower end surface 71 of the ring 7. As a result, the path part 60a is opened, and therefore, the first communication path 60 is opened. Consequently, the working liquid may flow into the liquid control chamber 63 through both of the first and second communication paths, 60 and 61.

The flow rate per unit time of the working liquid flowing into the liquid control chamber 63 may increase when the first communication path 60 is opened in addition to the second communication path 61. Therefore, the moving speed of the plunger 4 in the downward direction may increase in response to the increase of the flow rate of the working liquid that flows into the liquid control chamber 63.

As the plunger 4 continues to move further downward, the upper wall 42c of the annular recess 42 of the plunger 4 may contact with the upper end surface 72 of the ring 7. The plunger 4 then moves together with the ring 7 in the downward direction. The outlet valve 21 may be pressed downward by the plunger 4 and may either move together with the plunger 4 or move away from the plunger 4 so as to precede the plunger 4.

If the outlet valve 21 moves together with the plunger 4, the moving speed of the outlet valve 21 coincides with the moving speed of the plunger 4. Therefore, in the same manner as the moving speed of the plunger 4, the moving speed of the outlet valve 21 may be controlled by the flow rate of the working liquid flowing into the liquid control chamber 63. Because the moving speed of the plunger 4 in the downward direction (i.e., the closing direction of the outlet valve 21) is higher than the moving speed of the plunger 4 in the upward direction (i.e., the opening direction of the outlet valve 21), the outlet valve 21 can be more rapidly closed.

On the other hand, if the outlet valve 21 moves so as to precede the plunger 4, the movement of the outlet valve 21 may be primarily influenced by the pressure of the working liquid and may not be influenced or retarded by the pulsation reducing device 12. Therefore, the outlet valve 21 can be more rapidly closed than the rate of the plunger 4 would have otherwise allowed.

When the outlet valve 21 is opened, the working liquid discharged from the pump 2 flows into the first chamber 30a, resulting in an increase in the pressure within the first chamber 30a. The pressurized working liquid then flows into the second chamber 30b via the communication passage 51. The pressurized working liquid further flows into the master cylinder 13 via a flow path P6 and a pipeline P7.

As described above, according to the brake device 1 of the first representative embodiment, the pulsation reducing device 12 is provided on the downstream side of the outlet valve 21 of the pump 2 (as shown in FIG. 1). The location of the pulsation reducing device 12 is in order to control the opening and closing speed of the outlet valve 21, so as to reduce the pulsations in pressure of the working liquid discharged from the pump 2 via the outlet valve 21.

As described previously, when the outlet valve 21 is opening (as shown in FIG. 5) the pressure reducing device 12 suppresses the movement of the outlet valve 21 in the opening direction. The outlet valve 21 is not able to quickly open and the rate of increase in pressure of the working liquid discharged via the outlet valve 21 is low. As a result, the peak value of the pulsations of the discharged working liquid may also be low. Therefore, the distribution of amplitude in pressure of the pulsations may be smoother. In other words, the pulsations may be reduced in intensity.

In order to close the outlet valve 21, the outlet valve 21 may either move away from the plunger 4 so as to precede the plunger 4 (i.e., the outlet valve 21 may travel in the closing direction at a faster rate than the plunger 4) or the outlet valve 21 may move together with the plunger 4 as shown in FIG. 6. In the case of the situation that the outlet valve 21 moves apart from the plunger 4 so as to precede the plunger 4, the movement of the outlet valve 21 is not restricted by the pulsation reducing device 12. Therefore, the outlet valve 21 can quickly close. In the case of the situation that the outlet valve 21 moves together with the plunger 4, the outlet valve 21 may still quickly close because the restriction force applied to the plunger 4 by the rest of the pulsation reducing device 12 is small. Therefore, in either case, the outlet valve 21 can close relatively quickly to prevent the back flow of the working liquid toward the pumping member 20.

Further, the pulsation reducing device 12 includes the liquid control chamber 63 (shown in FIG. 2). The flow control device controls the flow rate of the working liquid flowing between the liquid control chamber 63 and the outside of the support member 5. Thus, as the flow rate of the working liquid that is discharged from the liquid control chamber 63 is decreased, there is an increase in the resistance against the movement of the plunger 4 into the liquid control chamber 63. The flow control device can therefore control the moving speed of the plunger 4. Consequently, the flow control device can control the opening and closing speed of the outlet valve 21 via the plunger 4.

Further, as shown in FIG. 2, the liquid control chamber 63 communicates with the outside of the support member 5 via the first and second communication paths, 60 and 61. The first communication path 60 can be opened and closed in response to the moving direction of the plunger 4. More specifically, the first communication path 60 is closed when the plunger 4 moves towards the liquid control chamber 63, and opened when the plunger 4 moves away from the liquid control chamber 63. Therefore, the flow rate per unit of time of the working liquid discharged from the liquid control chamber 63 may be reduced in order to resist against the movement of the plunger 4 towards the liquid control chamber 63. The result is that the plunger 4 can lower the opening speed of the outlet valve 21.

Second Representative Embodiment

A brake device according to a second representative embodiment will now be described with reference to FIGS. 7 to 11. The brake device according to the second representative embodiment differs from the brake device of the first representative embodiment in that a pulsation reducing device 17 (shown in FIG. 7) is incorporated in place of the pulsation reducing device 12 (shown in FIG. 2). In all other respects, the brake device according to the second representative embodiment is the same as the brake device of the first representative embodiment. Therefore, in FIGS. 7 to 11, the same reference numerals are affixed to the same or similar members previously described in the first representative embodiment. The second representative embodiment will only be described with respect to the construction that is different from the first representative embodiment.

Figure 7:
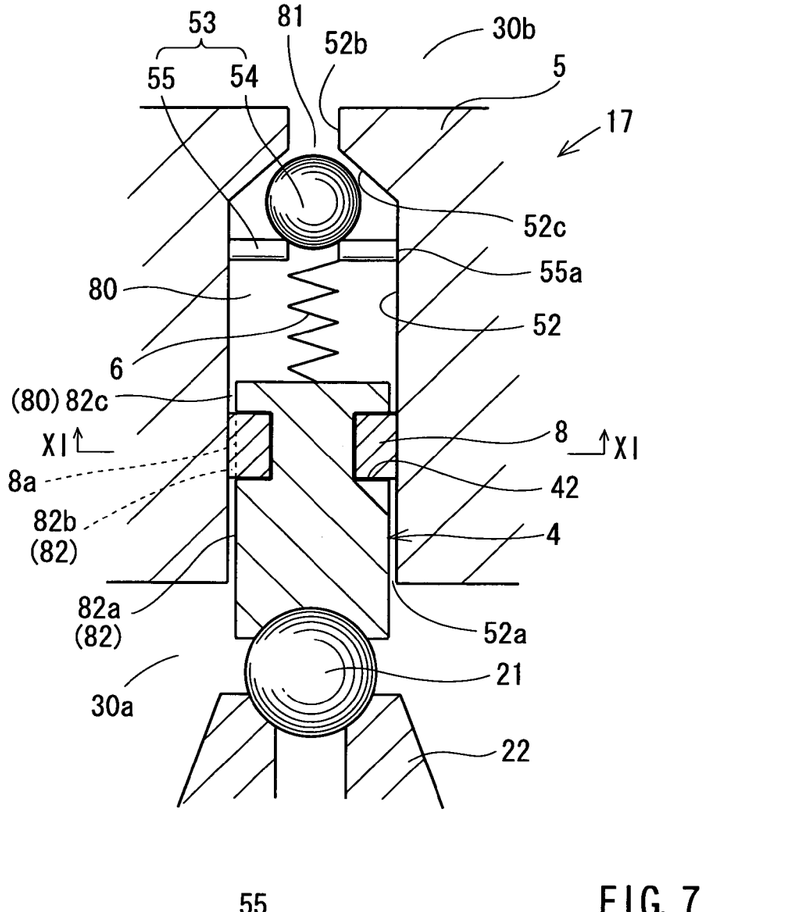
FIG. 7 is an enlarged cross sectional view of a pulsation reducing device of a second representative brake device.

Referring to FIG. 7, the pulsation reducing device 17 includes the plunger 4 and the support member 5. A support hole 52 is formed in the support member 5 and extends throughout the thickness of the support member 5. The support hole 52 has a lower opening 52a and an upper opening 52b. In addition, the support hole 52 has a tapered portion 52c that has a gradually decreasing diameter towards the upper opening 52b. Consequently, the upper opening 52b has a diameter smaller than the diameter of the lower opening 52a.

A valve device 53, a biasing member 6, and the plunger 4 are inserted into the support hole 52 in this order from the lower opening 52a.

Therefore, a liquid control chamber 80 is defined between the plunger 4 and the valve device 53. A first communication path 81 is defined on the upper side of the liquid control chamber 80 to provide communication between the liquid control chamber 80 and the second chamber 30b. The valve device 53 is disposed within the first communication path 81.

The valve device 53 includes a valve member 54 and an inner valve seat member 55. The valve member 54 is configured as a ball. The inner valve seat member 55 serves to prevent the valve member 54 from moving in a direction toward the liquid control chamber 80. The valve member 54 has a diameter greater than the diameter of the upper opening 52b. The valve member 54 can close the upper opening 52b, and thereby close the first communication path 81 when the valve member 54 moves upward.

Figure 8:
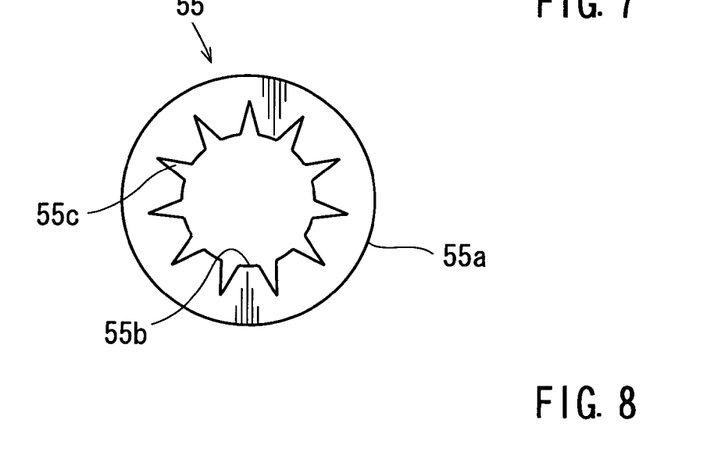
FIG. 8 is a plan view of an inner valve seat member of the second representative brake device.

As shown in FIG. 8, the inner valve seat member 55 has a substantially annular configuration and has an outer peripheral edge 55a and an inner peripheral edge 55b. The inner peripheral edge 55b has a diameter smaller than the diameter of the valve member 54. In addition, a plurality of radial cutout portions 55c are formed in the inner valve seat member 55 and extend radially from the inner peripheral edge 55b toward the outer peripheral edge 55a. Therefore, when the valve member 54 has been moved toward the lower opening 52a and contacts the inner peripheral edge 55b of the inner valve seat member 55, the working liquid may still flow through the inner valve seat member 55 via the cutout portions 55c.

The biasing member 6, configured as a coil spring as described in connection with the first representative embodiment, is interposed between the plunger 4 and the inner valve seat member 55. The biasing member 6 biases the plunger 4 in the downward direction (as viewed in FIG. 7).

Figure 11:
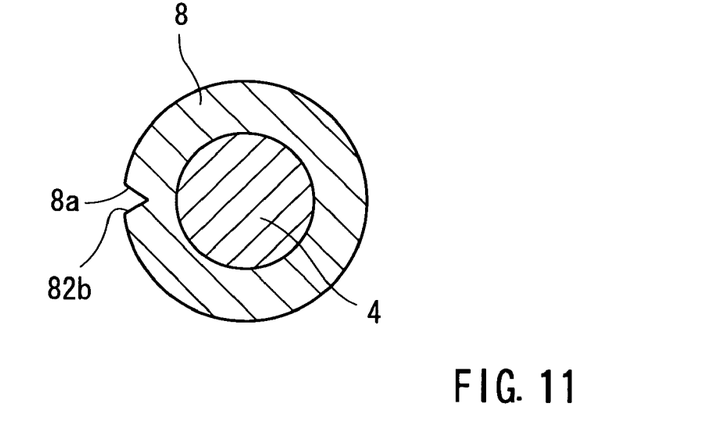
FIG. 11 is a cross sectional view of a ring and a plunger taken along line XI—XI in FIG. 7.

A ring 8 is fitted into the annular recess 42 of the plunger 4. As shown in FIG. 11, a cutout portion 8a is formed in the outer peripheral surface of the ring 8. As shown in FIG. 7, the cutout portion 8a extends throughout the thickness of the ring 8, so that a flow channel 82b is defined between the ring 8 and the inner circumferential wall of the support hole 52.

In addition, flow channels 82a and 82c are defined by the clearance between the outer peripheral surface of the plunger 4 and the inner wall of the support hole 52. Therefore, a second communication path 82 is formed by the flow channels 82a, 82b, and 82c, to provide communication between the liquid control chamber 80 and the first chamber 30a. As a result, the liquid control chamber 80 communicates with chambers outside of the support member 5 via the first and second communication paths 81 and 82.

Figure 9:
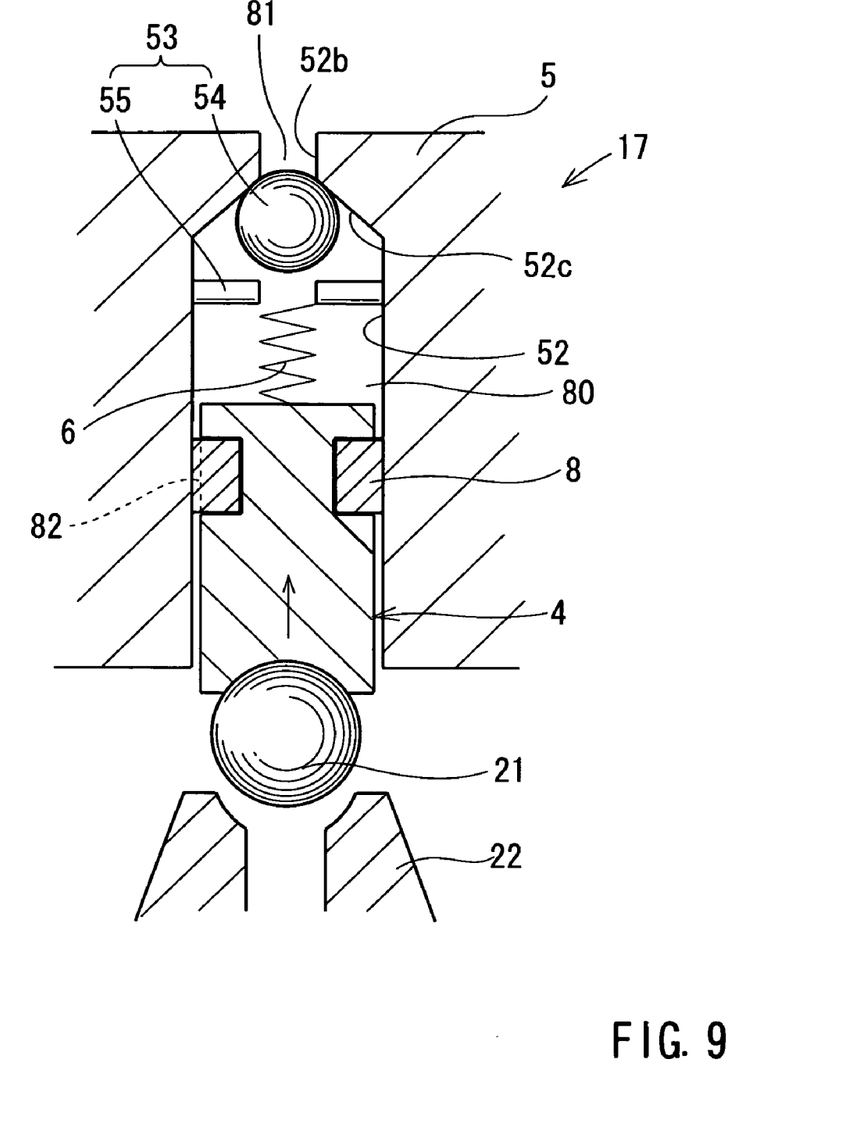
FIG. 9 is an enlarged cross sectional view of the pulsation reducing device of the second representative brake device and showing an outlet valve during the movement in an opening direction.
Figure 10:
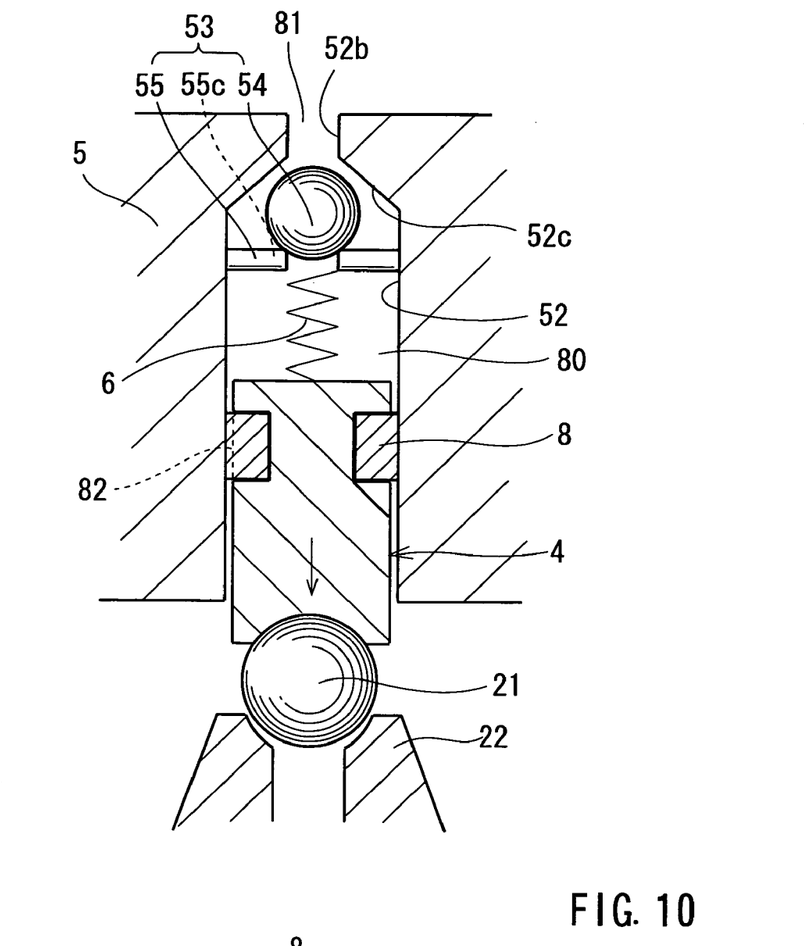
FIG. 10 an enlarged cross sectional view of the pulsation reducing device of the second representative brake device and showing the outlet valve during the movement in a closing direction.

The operation of the pulsation reducing device 17 will now be described with reference to FIGS. 9 and 10. When the working liquid is discharged from the pump 2, the outlet valve 21 moves upward to force the plunger 4 upward, as shown in FIG. 9. The increasing liquid pressure within the liquid control chamber 80 causes the valve member 54 to move upward. As a result, the first communication path 81 is closed. Therefore, the working liquid only flows out of the liquid control chamber 80 through the second communication path 82, which communicates with the first chamber 30a, restricting the movement of the plunger 4. Consequently, the movement of the outlet valve 21 in the opening direction is restricted by the pulsation reducing device 17. In other words, the moving speed of the valve 21 in the opening direction is reduced.

On the other hand, when the pressure of the working liquid discharged from the pump 2 is decreased, the plunger 4 may be moved downward by the biasing force of the biasing member 6. Then, the pressure is lowered within the liquid control chamber 80 and the valve member 54 moves downward to open the first communication path 81. The working liquid flows into the liquid control chamber 80 via both the first and second communication paths 81 and 82. In this way, the downward moving speed of the plunger 4 is controlled by the pulsation reducing device 17. In other words, the plunger 4 quickly moves to force the outlet valve 21 in the closing direction. As noted in connection with the first representative embodiment, the outlet valve 21 may move together with the plunger 4 or may move away from the plunger 4 to precede the plunger 4 in the closing direction.

(Possible Alternative Arrangements of First and Second Representative Embodiments)

(1) Although the plunger is inserted into the support hole formed in the support member in the first and second representative embodiments, this arrangement may be inverted such that the support member is inserted into the plunger. For example, the support member may have a projection extending toward the plunger and the support hole is formed in an upper portion of the plunger in order to receive the projection. A liquid control chamber and a flow control device configured in the same manner as the liquid control chamber and the flow control device of the first representative embodiment (or the second representative embodiment), may be respectively disposed between the projection and the support hole.

(2) In the first and second representative embodiments, the flow control device has two communication paths communicating between the liquid control chamber and the outside of the support member, and one of the flow communication paths is adapted to be opened and closed. However, the number of the communication paths is not limited to two. Thus, three or more communication paths may be provided and any one or more than one of the communication paths may be adapted to be opened and closed.

(3) In the first and second representative embodiments, the plunger 4 and the outlet valve 21 are formed as separate members from each other. However, the plunger and the outlet valve may be integrally formed with each other.

(4) In the first representative embodiment, the recesses 70 formed in the ring 7 define the second path parts (path parts 60b). However, the second path parts may be defined by recesses that are formed in the inner recess wall 42a of the annular recess 42 of the plunger 4. In addition, the number of the second paths may not be limited.

(5) In the second representative embodiment, the third path parts (path parts 60c) are defined by the recesses 42d formed in the upper wall 42c of the annular recess 42 of the plunger 4. However, recesses formed in the upper end surface 72 of the ring 7 may define the third path parts. In addition, the number of the third paths may not be limited.

The invention claimed is:

1. A brake device comprising:
at least one wheel cylinder operable by a pressure of a working liquid;

a reservoir arranged and constructed to store the working liquid discharged from the at least one wheel cylinder;
a pump arranged and constructed to transfer the working liquid from the reservoir;
an outlet valve disposed on a discharge side of the pump;
a master cylinder arranged and constructed to receive the working liquid delivered from the pump via the outlet valve;
a pulsation reducing device disposed on a downstream side of the outlet valve between the pump and the master cylinder, wherein the pulsation reducing device is arranged and constructed to control an operation speed of the outlet valve in order to reduce possible pulsations produced in the working liquid discharged from the pump;
wherein the pulsation reducing device comprises:
a plunger disposed on the downstream side of the outlet valve and is arranged and constructed to move in response to movement of the outlet valve;
a support member;
a support hole defined within the support member in order to movable receive the plunger;
a liquid control chamber defined within the support hole on a side of the plunger opposite to a side of the plunger opposing the outlet valve;
a communication device arranged and constructed to provide communication between the liquid control chamber and outside of the support member; and
a flow control device arranged and constructed to alter the flow rate of the working liquid flowing between the liquid control chamber and the outside of the support member via the communication device so as to control the moving speed of the plunger.

2. The brake device as in claim 1, wherein the communication device comprises a plurality of communication paths communicating between the liquid control chamber and the outside of the support member, and wherein the flow control device is operable to open and close at least one of the communication paths in response to the moving direction of the plunger.

3. A brake device comprising:
at least one brake cylinder operable by a pressure of a working liquid;
a pump arranged and constructed to deliver the working liquid to the at least one brake cylinder;
an outlet valve disposed on a discharge side of the pump; and
a pulsation reducing device associated with the outlet valve and operable to control an operating rate of the outlet valve in response to a change in the pressure of the working liquid discharged from the pump;
wherein the outlet valve comprises a valve member movable in an opening direction and a closing direction in response to the pressure of the working liquid discharged from the pump; and
the pulsation reducing device comprises:
a movable member disposed opposite to the valve member in the opening direction of the valve member;
a support member arranged and constructed to support the movable member such that the movable member is slidably movable relative to the support member in a direction parallel to the moving direction of the valve member;
a liquid control chamber defined between the movable member and the support member;
a communication device arranged and constructed to provide communication between the liquid control chamber and outside of the support member; and
a flow control device arranged and constructed to alter the flow of the working liquid that flows via the communication device in response to the movement of the movable member relative to the support member.

4. The brake device as in claim 3, wherein:
the movable member comprises a plunger;
the support member comprises a support hole defined in the support member in order to slidably receive the plunger,
the liquid control chamber is defined by the plunger within the support hole on a side of the plunger opposite to a side of the plunger directly opposing the valve member.

5. The brake device as in claim 4, further comprising a biasing device arranged and constructed to bias the plunger in the closing direction of the valve member.

6. The brake device as in claim 4, wherein:
the communication device comprises a first communication path defined within the support member
the first communication path has a first path end communicating with the liquid control chamber and a second path end communicating with the outside of the support member; and
the flow control device is arranged and constructed to alter the flow of the working liquid through the first communication path.

7. The brake device as in claim 6, wherein the first communication path is defined by the plunger and an inner wall of the support hole, and wherein the flow control device further comprises:
a control member disposed axially movably within a first recess formed in an outer surface of the plunger,
wherein the first recess comprises:
a first end in an axial direction of the plunger, and
a second end opposite to the first end in the axial direction of the plunger, wherein the first end communicates with the liquid control chamber, and the second end
communicates with the outside of the support member,
wherein the first communication path comprises a first flow channel defined between the control member and an inner wall of the first recess, and
wherein the control member is operable to open and close the first flow channel in response to the movement of the control member relative to the plunger.

8. The brake device as in claim 7, the communication device further comprises a second communication path:
wherein the second communication path comprises a second flow channel defined between the control member and an inner wall of the support hole.

9. The brake device as in claim 7, wherein:
the control member comprises a ring having a thickness in the axial direction of the plunger; and
wherein the first recess comprises an annular recess that has a width in the axial direction of the plunger; and
wherein the thickness of the ring is smaller than the width of the annular recess, and
wherein the first communication path comprises first and second clearances defined on both sides of the ring in the axial direction and a third clearance defined between an inner peripheral surface of the ring and an inner recess wall of the annular recess opposing thereto; and wherein the first flow channel is defined by one of the first and second clearances on the side of the valve member and is closed by the ring when the plunger moves in the opening direction of the valve member.

10. The brake device as in claim 7, wherein the support hole has an open first end opening into the outside of the support member and a closed second end positioned on the side opposing to the plunger, so that the liquid control chamber is defined between the plunger and the closed second end of the support hole.

11. The brake device as in claim 6, wherein:
the support hole has a first end and a second end each opening to the outside of the support member;
wherein the first end is disposed on a side of the support member nearest to the valve member and the second end is disposed on the side of the support member opposite to the side of the support member nearest to the valve member, so that the liquid control chamber is defined between the plunger and the second end of the support hole; and
wherein the first communication path is defined by the second end of the support hole; and
wherein the flow control device comprises a second valve member disposed within the liquid control chamber and operable to open and close the second end of the support hole in response to the pressure within the liquid control chamber.

12. The brake device as in claim 11, wherein:
the communication device further comprises a second communication path defined between the plunger and the inner wall of the support hole, and
the second communication path communicates between the liquid control chamber and the outside of the support member via the first end of the support hole.

13. The brake device as in claim 11, further comprising a valve seat formed within the second end of the support hole, and
wherein the second valve member comprises a ball that closes the second end of the support hole when seated upon the valve seat.

14. The brake device as in claim 4, wherein the valve member comprises a ball, and wherein a valve support portion is formed on one end of the plunger opposing to the ball and has a spherical concave surface corresponding to the ball, so that the ball contacts with the plunger via the spherical concave surface of the valve support portion.

* * * * *